(12) United States Patent
Takahashi et al.

(10) Patent No.: US 9,233,606 B2
(45) Date of Patent: Jan. 12, 2016

(54) VEHICLE DRIVE DEVICE

(75) Inventors: Satoru Takahashi, Nisshin (JP); Yasushi Kobiki, Toyota (JP); Isao Sato, Nagoya (JP); Takeshi Miyagawa, Toyokawa (JP); Hiroaki Kiyokami, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/382,031

(22) PCT Filed: Mar. 2, 2012

(86) PCT No.: PCT/JP2012/055477
§ 371 (c)(1),
(2), (4) Date: Aug. 29, 2014

(87) PCT Pub. No.: WO2013/128647
PCT Pub. Date: Sep. 6, 2013

(65) Prior Publication Data
US 2015/0011347 A1    Jan. 8, 2015

(51) Int. Cl.
F16H 3/72 (2006.01)
F16H 37/06 (2006.01)
B60K 6/365 (2007.10)
B60K 6/445 (2007.10)
B60K 17/08 (2006.01)
B60K 1/00 (2006.01)
B60W 10/02 (2006.01)
B60W 10/08 (2006.01)
B60W 10/115 (2012.01)
F16H 3/44 (2006.01)

(52) U.S. Cl.
CPC . *B60K 17/08* (2013.01); *B60K 1/00* (2013.01);
*B60W 10/02* (2013.01); *B60W 10/08* (2013.01);
*B60W 10/115* (2013.01); *F16H 3/44* (2013.01);
*B60K 6/365* (2013.01); *B60K 6/445* (2013.01);
*B60K 2001/001* (2013.01); *F16H 2200/0021*
(2013.01); *F16H 2200/0034* (2013.01); *F16H 2200/2005* (2013.01); *F16H 2200/2007*
(2013.01); *F16H 2200/2033* (2013.01); *F16H 2200/2035* (2013.01); *F16H 2200/2082*
(2013.01)

(58) Field of Classification Search
CPC . B60K 6/365; B60K 6/445; F16H 2200/0021
See application file for complete search history.

(56) References Cited

U.S. PATENT DOCUMENTS

| | | | |
|---|---|---|---|
| 7,240,751 B2 * | 7/2007 | Hoare et al. | 180/65.25 |
| 2005/0178593 A1 * | 8/2005 | Oshidari | 180/65.2 |
| 2014/0031168 A1 * | 1/2014 | Yang et al. | 477/3 |

FOREIGN PATENT DOCUMENTS

| | | |
|---|---|---|
| JP | 2002-036894 A | 2/2002 |
| JP | 2006-183861 A | 7/2006 |

* cited by examiner

Primary Examiner — Tisha Lewis
(74) Attorney, Agent, or Firm — Kenyon & Kenyon LLP

(57) ABSTRACT

A vehicle drive device has an outer rotor type electric motor with a rotor disposed on an outer circumferential side of a stator including a first power transmission path coupling an inside of the rotor and drive wheels; and a second power transmission path coupling an outside of the rotor and the drive wheels, the first power transmission path and the second power transmission path having different gear ratios, one power transmission path of the first power transmission path and the second power transmission path being coupled to the drive wheels to make a gear change.

5 Claims, 3 Drawing Sheets

VEHICLE DRIVE DEVICE

CROSS-REFERENCE TO RELATED APPLICATIONS

This is a national phase application based on the PCT International Patent Application No. PCT/JP2012/055477 filed Mar. 2, 2012, the entire contents of which are incorporated herein by reference.

TECHNICAL FIELD

The present invention relates to a vehicle drive device including an electric motor and particularly to compactification of the vehicle drive device.

BACKGROUND ART

A vehicle drive device including an electric motor is implemented as represented by an electric automobile. An example thereof is a power transmission device of a motor driven vehicle described in Patent Document 1. The power transmission device of Patent Document 1 includes a transmission 12 capable of shifting between two speed gear stages i.e., a low-speed gear stage and a high-speed gear stage and uses the transmission 12 to change speed of rotation of an electric motor 11.

PRIOR ART DOCUMENTS

Patent Documents

Patent Document 1: Japanese Laid-Open Patent Publication No. 2002-36894
Patent Document 2: Japanese Laid-Open Patent Publication No. 2006-183861

SUMMARY OF THE INVENTION

Problem to be Solved by the Invention

The power transmission device of Patent Document 1 has the electric motor 11 and the transmission 12 arranged side by side in the axial direction. Therefore, the power transmission device has a problem of an increase in size in the axial direction. The electric motor 11 and the transmission 12 are arranged side by side in the axial direction because the electric motor 11 is an inner rotor type electric motor with a rotor disposed on an inner circumferential side and, therefore, a rotor shaft of the electric motor must be extended in the axial direction and coupled to the transmission.

The present invention was conceived in view of the situations and it is therefore an object of the present invention to provide a vehicle drive device configured compactly in the axial direction.

Means for Solving the Problem

To achieve the object, the first aspect of the invention provides a vehicle drive device having an outer rotor type electric motor with a rotor disposed on an outer circumferential side of a stator, comprising: (a) a first power transmission path coupling an inside of the rotor and drive wheels; and (b) a second power transmission path coupling an outside of the rotor and the drive wheels, (c) the first power transmission path and the second power transmission path having different gear ratios, (d) one power transmission path of the first power transmission path and the second power transmission path being coupled to the drive wheels to make a gear change.

Effects of the Invention

Consequently, the outer rotor type electric motor can be used for making up two power transmission paths, i.e., the first power transmission path outputting power from the inner circumference of the rotor and the second power transmission path outputting power from the outside of the rotor. Therefore, since this enables the disposition of transmission mechanisms on the inside and the outside of the rotor, for example, the vehicle drive device can compactly be configured in the axial direction.

Preferably, the second aspect of the invention provides the vehicle drive device recited in the first aspect of the invention, wherein (a) the rotor of the electric motor is formed axially longer than the stator to dispose an inner planetary gear device on an inner circumferential side of the rotor, wherein (b) an outer planetary gear device is disposed on an outer circumferential side of the rotor, wherein (c) a ring gear of the inner planetary gear device is integrally formed on the inner circumferential side of the rotor, and wherein (d) a sun gear of the outer planetary gear device is integrally formed on the outer circumferential side of the rotor. Consequently, since the inner planetary gear device and the outer planetary gear device can be arranged at positions overlapping with the rotor in the radial direction, the vehicle drive device can be restrained from elongating in the axial direction. Since the ring gear of the inner planetary gear device and the sun gear of the outer planetary gear device are integrally formed with the rotor, an increase in parts count is suppressed.

Preferably, the third aspect of the invention provides the vehicle drive device recited in the second aspect of the invention, wherein (a) the inner planetary gear device is made up of a single pinion type planetary gear device with a sun gear of the inner planetary gear device coupled to the stator, the ring gear of the inner planetary gear device coupled to the rotor, and a carrier of the inner planetary gear device coupled via a first clutch to the drive wheels, and wherein (b) the outer planetary gear device is made up of a single pinion type planetary gear device with the sun gear of the outer planetary gear device coupled to the rotor, a ring gear of the outer planetary gear device coupled to a non-rotating member, and a carrier of the outer planetary gear device coupled via a second clutch to the drive wheels. Consequently, either the first clutch or the second clutch can selectively be coupled to achieve shifting between the two gear stages.

Preferably, the fourth aspect of the invention provides the vehicle drive device recited in the second aspect of the invention, wherein (a) the inner planetary gear device is made up of a double pinion type planetary gear device with a carrier of the inner planetary gear device coupled to the stator, the ring gear of the inner planetary gear device coupled to the rotor, and a sun gear of the inner planetary gear device coupled via a first clutch to the drive wheels, and wherein (b) the outer planetary gear device is made up of a single pinion type planetary gear device with the sun gear of the outer planetary gear device coupled to the rotor, a ring gear of the outer planetary gear device coupled to a non-rotating member, and a carrier of the outer planetary gear device coupled via a second clutch to the drive wheels. Consequently, either the first clutch or the second clutch can selectively be coupled to achieve shifting between the two gear stages.

Preferably, the fifth aspect of the invention provides the vehicle drive device recited in the third or fourth aspect of the invention, wherein one of the first clutch and the second clutch is made up of a one-way clutch. Consequently, the drive device is compactly configured in the axial direction.

MODE FOR CARRYING OUT THE INVENTION

Preferably, the first clutch and the second clutch are implemented by using hydraulic friction engagement devices or electromagnetic clutches.

An example of the present invention will now be described in detail with reference to the drawings. In the following examples, the figures are simplified or deformed as needed and portions are not necessarily precisely depicted in terms of dimension ratio, shape, etc.

First Example

Figure 1:
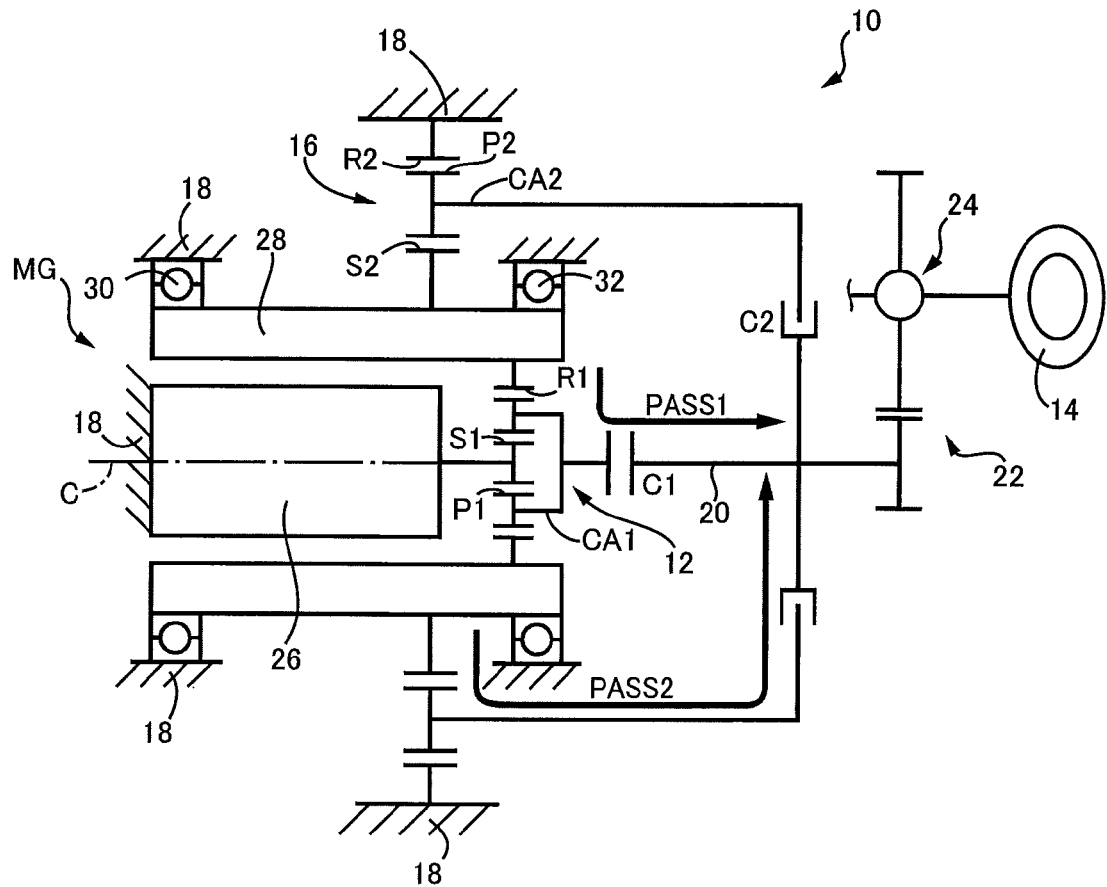
FIG. 1 is a schematic of a vehicle drive device to which the present invention is preferably applied.

FIG. 1 is a schematic of a vehicle drive device 10 (hereinafter referred to as a drive device 10) to which the present invention is preferably applied. The drive device 10 includes an electric motor MG acting as a drive source, a single pinion type inner planetary gear device 12 acting as a first transmission mechanism, a first clutch C1 selectively coupling the inner planetary gear device 12 and drive wheels 14, an outer planetary gear device 16 acting as a second transmission mechanism, and a second clutch C2 selectively coupling the outer planetary gear device 16 and the drive wheels 14, in a case 18 that is a non-rotating member. Both the first clutch C1 and the second clutch C2 are coupled via an output shaft 20, a final gear pair 22, and a differential device (final reduction gear) 24 to the left and right drive wheels 14 (one of which is not depicted).

The electric motor MG is a motor generator having functions of a motor generating a drive force and a generator (electric generator) generating a reaction force. The electric motor MG of this example is an outer rotor type electric motor with a rotor disposed on an outer circumferential side of a stator. As depicted in FIG. 1, the electric motor MG includes a stator 26 disposed and non-rotatably fixed around a rotation axis C, and a circular cylindrical rotor 28 disposed on the outer circumferential side of the stator 26.

The rotor 28 disposed on the outer circumferential side of the stator 26 is supported rotatably around the rotation axis C by the case 18 that is the non-rotating member via a bearing 30 and a bearing 32 disposed on the both outer circumferential ends. The rotor 28 is formed (extended) axially longer than the stator 26 toward the output shaft 20 in the axial direction. Therefore, a space is formed in an inner circumferential of the rotor 28 on the output shaft 20 side in the axial direction and the inner planetary gear device 12 is disposed in this space. This disposition of the inner planetary gear device 12 on the inner circumferential side of the rotor 28 eliminates the need for a coupling member required in the case of arranging the rotor 28 and the inner planetary gear device 12 side by side in the axial direction and suppresses an increase in parts count. Since the inner planetary gear device 12 is housed in an inner circumference of the electric motor MG the drive device 10 is compactly configured in the axial direction.

The inner planetary gear device 12 is made up of a single pinion type planetary gear device including a sun gear S1, a pinion gear P1, a carrier CA1 rotatably and revolvably supporting the pinion gear P1, and a ring gear R1 meshed with the sun gear S1 via the pinion gear P1. The inner planetary gear device 12 has the sun gear S1 coupled and non-rotatably fixed to the stator 26, the ring gear R1 coupled to the rotor 28 of the electric motor MG, and the carrier CA1 coupled via the first clutch C1 to the output shaft 20. Since the output shaft 20 is coupled via the final gear pair 22 and the differential device 24 to the drive wheels 14, the carrier CA1 is coupled via the first clutch C1 to the drive wheels 14. As a result, rotation of the electric motor MG (i.e., the rotor 28) is reduced in speed and output from the carrier CA1. A first power transmission path PASS1 is formed that couples the drive wheels 14 from the ring gear R1 formed inside the rotor 28 via the inner planetary gear device 12, the first clutch C1, the output shaft 20, the final gear pair 22, and the differential device 24.

The outer planetary gear device 16 is disposed on an outer circumferential side of the rotor 28. Therefore, since the rotor 28 and the outer planetary gear device 16 are arranged at positions overlapping in the radial direction (i.e., arranged at the same position in the axial direction), the drive device 10 is compactly configured by the axial length of the outer planetary gear device 16. Since this eliminates the need for a coupling member required in the case of arranging the rotor 28 and the outer planetary gear device 16 side by side in the axial direction, an increase in parts count is suppressed.

The outer planetary gear device 16 is made up of a single pinion type planetary gear device including a sun gear S2, a pinion gear P2, a carrier CA2 rotatably and revolvably supporting the pinion gear P2, and a ring gear R2 meshed with the sun gear S2 via the pinion gear P2. The outer planetary gear device 16 has the sun gear S2 coupled to the rotor 28, the ring gear R2 coupled to the case 18 that is the non-rotating member, and the carrier CA2 coupled via the second clutch C2 to the output shaft 20. Since the output shaft 20 is coupled via the final gear pair 22 and the differential device 24 to the drive wheels 14, the carrier CA2 is coupled via the second clutch C2 to the drive wheels 14. As a result, the rotation of the electric motor MG (i.e., the rotor 28) is reduced in speed and output from the carrier CA2. A second power transmission path PASS2 is formed that couples the drive wheels 14 from the sun gear S2 formed outside the rotor 28 via the outer planetary gear device 16, the second clutch C2, the output shaft 20, the final gear pair 22, and the differential device 24.

Figure 2:
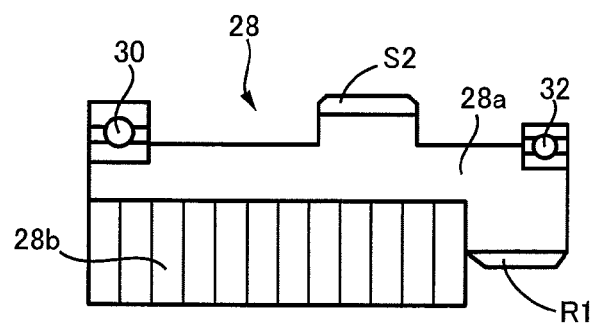
FIG. 2 is a diagram of a specific structure of the rotor of FIG. 1.

FIG. 2 is a diagram of a specific structure of the rotor 28 of FIG. 1. The rotor 28 includes a cylindrically-shaped main body 28a, and a rotor core 28b consisting of a plurality of laminated steel plates disposed on an inner circumferential side of the main body 28a. On an inner circumferential side of the main body 28a closer to the bearing 32 in the axial direction, the ring gear R1 of the inner planetary gear device 12 is integrally formed side by side with the rotor core 28b in the axial direction. On an outer circumferential side of the main body 28a near the center in the axial direction, the sun gear S2 of the outer planetary gear device 16 is integrally formed. Since this eliminates the needs for a coupling member coupling the rotor 28 and the ring gear R1 of the inner planetary gear device 12 and a coupling member coupling the rotor 28 and the sun gear S2 of the outer planetary gear device 16, an increase in parts count is suppressed and the production cost is reduced. Since only the ring gear R1 is formed on the inner circumferential side of the rotor 28, productivity is favorable as compared to the case of forming two sets of internal teeth. The increase in parts count can further be suppressed by achieving an integrally-formed structure for the stator 26 and the sun gear S1 of the inner planetary gear device 12 coupled thereto.

The first clutch C1 is inserted between the carrier CA1 that is an output member of the inner planetary gear device 12 and the output shaft 20 on the rotation axis C and selectively couples the carrier CA1 of the inner planetary gear device 12 and the output shaft 20. The first clutch C1 is implemented by using a hydraulic friction engagement device controlled by oil pressure or an electromagnetic clutch, for example.

The second clutch C2 is inserted between the carrier CA2 that is an output member of the outer planetary gear device 16 and the output shaft 20 and selectively couples the carrier CA2 of the outer planetary gear device 16 and the output shaft 20. The second clutch C2 is implemented by using a hydraulic friction engagement device controlled by oil pressure or an electromagnetic clutch, for example.

An operation of the drive device 10 configured as described above will be described. The drive device 10 of this example selectively engages the first clutch C1 and the second clutch C2 to put either the first power transmission path PASS1 or the second power transmission path PASS2 into a coupled state, thereby achieving two-speed shift stages. Specifically, when the first clutch C1 is engaged while the second clutch C2 is released, the first power transmission path PASS1 is put into a power transmission state and the rotor 28 is operatively coupled via the inner planetary gear device 12, the first clutch C1, the output shaft 20, the final gear pair 22, and the differential device 24 to the drive wheels 14. A rotation of the rotor 28 is output from the output shaft 20 with a speed changed based on a gear ratio γ1 of the inner planetary gear device 12 and is transmitted to the drive wheels 14. With regard to the gear ratio γ1 of the inner planetary gear device 12, when a ratio of a teeth number Zs1 of the sun gear S1 to a teeth number Zr1 of the ring gear R1 is α1 (=Zs1/Zr1), the gear ratio γ1 is represented by the following Equation (1).

$$\gamma 1 = 1 + \alpha 1 \quad (1)$$

When the first clutch C1 is released while the second clutch C2 is engaged, the second power transmission path PASS2 is put into the coupled state and the rotor 28 is operatively coupled via the outer planetary gear device 16, the second clutch C2, the output shaft 20, the final gear pair 22, and the differential device 24 to the drive wheels 14. The rotation of the rotor 28 is output from the output shaft 20 with a speed changed based on a gear ratio γ2 of the outer planetary gear device 16 and is transmitted to the drive wheels 14. With regard to the gear ratio γ2 of the outer planetary gear device 16, when a ratio of a teeth number Zs2 of the sun gear S2 to a teeth number Zr2 of the ring gear R2 is α2 (=Zs2/Zr2), the gear ratio γ2 is represented by the following equation (2).

$$\gamma 2 = (1 + \alpha 2)/\alpha 2 \quad (2)$$

Figure 3:
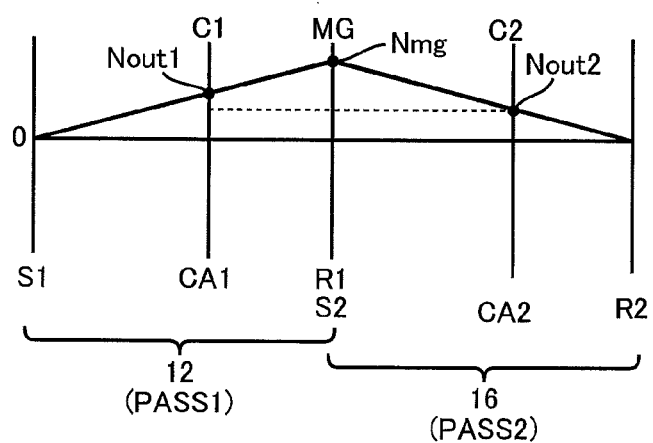
FIG. 3 is a collinear diagram of rotation speeds of rotating elements of the inner planetary gear device and the outer planetary gear device represented by straight lines in the vehicle drive device of FIG. 1.

FIG. 3 is a collinear diagram of rotation speeds of rotating elements of the inner planetary gear device 12 and the outer planetary gear device 16 represented by straight lines in the drive device 10. FIG. 3 depicts the rotation speed of the inner planetary gear device 12 on the left side and the rotation speed of the outer planetary gear device 16 on the right side. Vertical lines depicted in FIG. 3 indicate, from left to right, the respective rotation speeds of the sun gear S1 of the inner planetary gear device 12, the carrier CA1 of the inner planetary gear device 12, the carrier CA1 of the inner planetary gear device 12 and the sun gear S2 of the outer planetary gear device 16, the carrier CA2 of the outer planetary gear device 16, and the ring gear R2 of the outer planetary gear device 16.

Describing the rotation speed of the inner planetary gear device 12 depicted on the left side of FIG. 3, the sun gear S1 is coupled to the stator 26 and therefore has the rotation speed of zero. The ring gear R1 acting as an input element is coupled to the electric motor MG (rotor 28) and therefore has the rotation speed equal to rotation speed Nmg of the electric motor MG. The carrier CA1 acting as the output element has a rotation speed Nout1 based on the gear ratio γ1 of the inner planetary gear device 12. As can be seen from FIG. 3 and Equation (1), the inner planetary gear device 12 acts as a speed reduction mechanism that reduces the speed of the rotation of the electric motor MG input to the ring gear R1 and that outputs the rotation from the carrier CA1.

Describing the rotation speed of the outer planetary gear device 16 depicted on the right side of FIG. 3, the sun gear S2 acting as an input element is coupled to the electric motor MG (rotor 28) and therefore has the rotation speed equal to the rotation speed Nmg of the electric motor MG. The ring gear R2 is coupled to the case 18 that is the non-rotating member and therefore has the rotation speed of zero. The carrier CA2 acting as the output element has a rotation speed Nout2 based on the gear ratio γ2 of the outer planetary gear device 16. As can be seen from FIG. 3 and Equation (2), the outer planetary gear device 16 acts as a speed reduction mechanism that reduces the speed of the rotation of the electric motor MG input to the sun gear S2 and that outputs the rotation from the carrier CA2.

The gear ratio γ1 of the inner planetary gear device 12 and the gear ratio γ2 of the outer planetary gear device 16 are set to different values. Therefore, since the rotation of the electric motor MG is changed to different rotation speeds through the first power transmission path PASS1 and the second power transmission path PASS2, shifting between two gear stages can be achieved by selectively engaging either the first clutch C1 or the second clutch C2 to couple either the first power transmission path PASS1 or the second power transmission path PASS2.

Since the gear ratio γ2 is set to a value larger than the gear ratio γ1 in this example, when the first clutch C1 is engaged, the first power transmission path PASS1 is put into the coupled state and the drive device 10 is shifted to a high-speed gear stage. When the second clutch C2 is engaged, the second power transmission path PASS2 is put into the coupled state and causes the rotation of the electric motor MG to be further reduced as compared to the case of coupling the first power transmission path PASS1 and the drive device 10 is shifted to a low-speed gear stage. Therefore, for example, in a low-speed running state, the second clutch C2 is engaged to make a shift to the low-speed gear stage. When a vehicle speed increases to a high-speed running state, the second clutch C2 is released and the first clutch C1 is engaged and the drive device 10 is shifted to the high-speed gear stage. In a neutral state, the first clutch C1 and the second clutch C2 are released. In the drive device 10, the first clutch C1 and the second clutch C2 are selectively engaged to enable shifting between the two gear stages.

As described above, according to this example, the outer rotor type electric motor MG can be used for making up two power transmission paths, i.e., the first power transmission path PASS1 outputting power from the inner circumference of the rotor 28 and the second power transmission path PASS2 outputting power from the outside of the rotor 28. Therefore, since this enables the disposition of the transmission mechanisms (the inner planetary gear device 12, the outer planetary gear device 16) on the inside and the outside of the rotor 28, for example, the vehicle drive device 10 can compactly be configured in the axial direction.

According to this example, since the rotor 28 of the electric motor MG is formed axially longer than the stator 26, the inner planetary gear device 12 is disposed on the inner circumferential side of the rotor 28 and the outer planetary gear device 16 is disposed on the outer circumferential side of the rotor 28 with the ring gear R1 of the inner planetary gear device 12 integrally formed on the inner circumferential side of the rotor 28 and the sun gear S2 of the outer planetary gear device 16 integrally formed on the outer circumferential side of the rotor 28. As a result, since the inner planetary gear device 12 and the outer planetary gear device 16 can be arranged at positions overlapping with the rotor 28 in the radial direction, the vehicle drive device 10 can be restrained from elongating in the axial direction. Since the ring gear R1 of the inner planetary gear device 12 and the sun gear S2 of the outer planetary gear device 16 are integrally formed with the rotor 28, an increase in parts count is suppressed and the production cost is restrained.

According to this example, the inner planetary gear device 12 is made up of a single pinion type planetary gear device with the sun gear S1 of the inner planetary gear device 12 coupled to the stator 26, the ring gear R1 of the inner planetary gear device 12 coupled to the rotor 28, and the carrier CA1 of the inner planetary gear device 12 coupled via the first clutch C1 to the drive wheels 14, and the outer planetary gear device 16 is made up of a single pinion type planetary gear device with the sun gear S2 of the outer planetary gear device 16 coupled to the rotor 28, the ring gear R2 of the outer planetary gear device 16 coupled to the case 18, and the carrier CA2 of the outer planetary gear device 16 coupled via the second clutch C2 to the drive wheels 14. As a result, either the first clutch C1 or the second clutch C2 can selectively be coupled to achieve shifting between the two gear stages.

According to this example, the rotor 28 can be held by tow bearings, i.e., the bearing 30 and the bearing 32.

Another example of the present invention will be described. In the following description, the portions common with the example are denoted by the same reference numerals and will not be described.

Second Example

Figure 4:
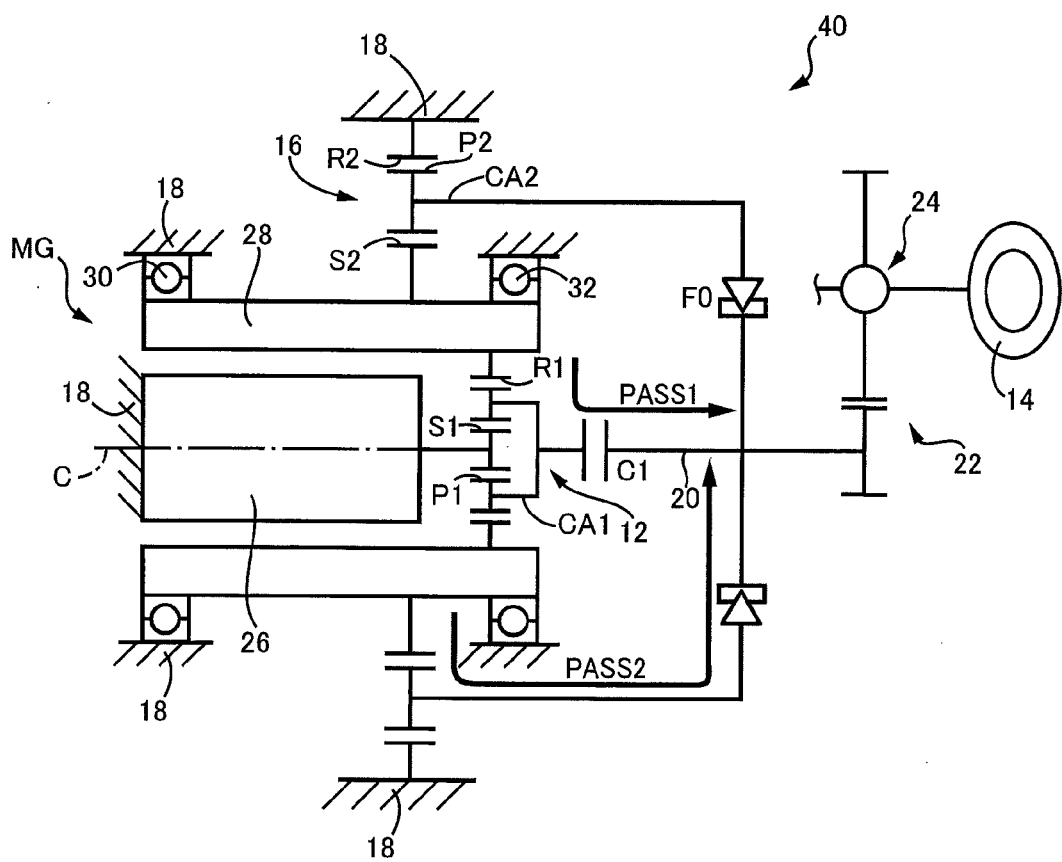
FIG. 4 is a schematic of a vehicle drive device that is another example of the present invention.

FIG. 4 is a schematic of a vehicle drive device 40 (hereinafter referred to as a drive device 40) that is another example of the present invention. Comparing the drive device 40 with the drive device 10 described above, a one-way clutch F0 is disposed instead of the second clutch C2 disposed on the drive device 10. The other constituent elements are the same as the drive device 10 described above and therefore will not be described, and the points different from the example, i.e., configuration and operation of the one-way clutch F0 will be described.

The one-way clutch F0 is disposed between the carrier CA2 of the outer planetary gear device 16 and the output shaft 20 and allows relative rotation in only one direction. Specifically, when the rotation speed of the carrier CA2 of the outer planetary gear device 16 is higher than rotation speed of the output shaft 20, the one-way clutch F0 couples the carrier CA2 and the output shaft 20 and, when the rotation speed of the output shaft 20 becomes higher than the rotation speed of the carrier CA2, the one-way clutch F0 enters an idling state to interrupt the coupling. For example, a sprag type one-way clutch is used for the one-way clutch F0.

A specific operation of the drive device 40 will hereinafter be described. When the electric motor MG rotates while the first clutch C1 is released in the drive device 40, the carrier CA2 rotates via the outer planetary gear device 16. In this case, the one-way clutch F0 is coupled to put the second power transmission path PASS2 into the coupled state and the drive device 40 is shifted to the low-speed gear stage. When the vehicle speed increases and the first clutch C1 is engaged, since the carrier CA1 of the inner planetary gear device 12 and the output shaft 20 are coupled, the first power transmission path PASS1 is put into the coupled state to make a shift to the high-speed gear stage. Therefore, the rotation of the electric motor MG is changed in speed via the inner planetary gear device 12 and output from the output shaft 20.

As is the case with the example, the gear ratio $\gamma 2$ of the outer planetary gear device 16 is set larger than the gear ratio $\gamma 1$ of the inner planetary gear device 12 and the rotation speed of the carrier CA1 becomes higher than the rotation speed of the carrier CA2. Therefore, when the first clutch C1 is engaged, since the output shaft 20 coupled to the carrier CA1 rotates at higher speed than the carrier CA2, the one-way clutch F0 enters an idling state and the second power transmission path PASS2 is interrupted. As a result, while the first power transmission path PASS1 is in the coupled state, the second power transmission path PASS2 is interrupted and, therefore, no effect occurs from the second power transmission path PASS2. Thus, even when the one-way clutch F0 is disposed instead of the second clutch C2 of the example, the first clutch C1 can selectively be engaged to enable shifting between the two gear stages.

Since the inner planetary gear device 12 and the outer planetary gear device 16 are arranged at positions overlapping with the rotor 28 also in the drive device 40 as is the case with the drive device 10 of the example, the drive device 40 is compactly configured in the axial direction.

As described above, since this example basically has the same structure as the drive device 10 described above, the drive device 40 is compactly configured in the axial direction. Moreover, since the clutch is made up of the one-way clutch F0, the drive device 40 can simply be configured. Since only the first clutch C1 needs to be engaged and released at the time of gear change, control is made easy.

Third Example

Figure 5:
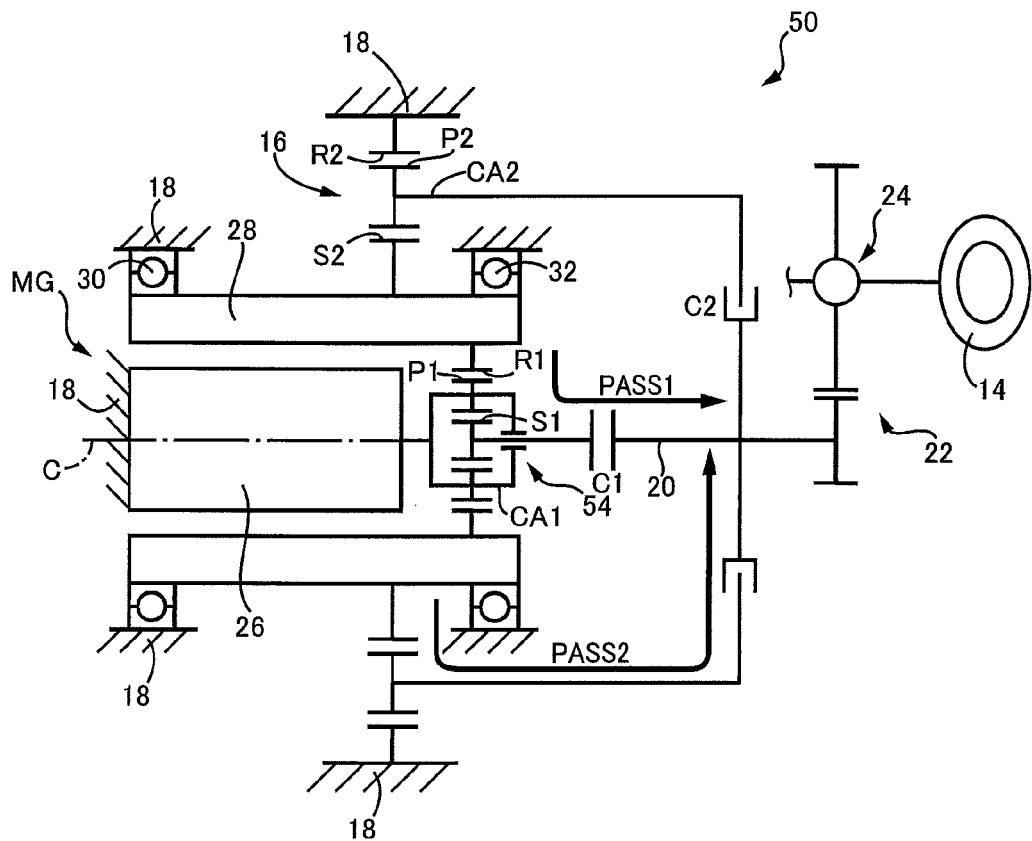
FIG. 5 is a schematic of a vehicle drive device that is a further example of the present invention.

FIG. 5 is a schematic of a vehicle drive device 50 (hereinafter referred to as a drive device 50) that is a further example of the present invention. Comparing the drive device 50 with the drive device 10 described above, a configuration of an inner planetary gear device 54 disposed on the inner circumferential side of the rotor 28 is different in this example. The other constituent elements are the same as the drive device 10 described above and therefore will not be described, and the points different from the drive device 10 of the example, i.e., configuration and operation of the inner planetary gear device 54 will be described.

The inner planetary gear device 54 of this example is made up of a double pinion type planetary gear device including sun gear S1, a plurality pairs of pinion gears P1 meshed with each other, carrier CA1 rotatably and revolvably supporting the pinion gears P1, and ring gear R1 meshed with the sun gear S1 via the pinion gears P1. As depicted in FIG. 5, the inner planetary gear device 54 has the carrier CA1 coupled and non-rotatably fixed to the stator 26, the ring gear R1 coupled to the rotor 28 of the electric motor MG and the sun gear S1 coupled via the first clutch C1 to the output shaft 20 (drive wheels 14).

When the inner planetary gear device 54 is made up of the double pinion type planetary gear device as described above and rotating elements of the inner planetary gear device 54 are coupled as described above, the rotation of the electric motor MG (rotor 28) is increased in speed and output from the sun gear S1. In short, the inner planetary gear device 54 acts as a speed increasing mechanism. Therefore, when the first clutch C1 is engaged, the first power transmission path PASS1 is put into the coupled state and the drive device 50 is shifted to the high-speed gear stage. The outer planetary gear device 16 has the same configuration as the example described above and, when the second clutch C2 is engaged, the drive device 50 is shifted to the low-speed gear stage.

Since the inner planetary gear device 54 is disposed on the inner circumferential side of the rotor 28 and the outer planetary gear device 16 is disposed on the outer circumferential side of the rotor 28 also in the drive device 50, the drive device 50 is compactly configured in the axial direction. The ring gear R1 of the inner planetary gear device 54 is integrally formed on the inner circumferential side of the rotor 28 and the sun gear S2 of the outer planetary gear device 16 is integrally formed on the outer circumferential side of the rotor 28.

Figure 6:
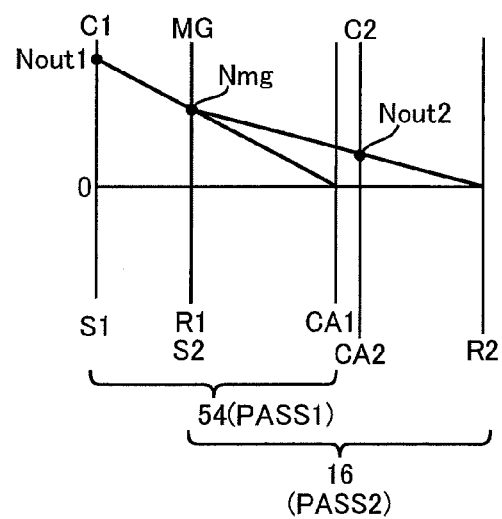
FIG. 6 is a collinear diagram of rotation speeds of rotating elements of the inner planetary gear device and the outer planetary gear device represented by straight lines in the vehicle drive device of FIG. 5.

FIG. 6 is a collinear diagram of rotation speeds of the rotating elements of the inner planetary gear device 54 and the outer planetary gear device 16 represented by straight lines in the drive device 50. FIG. 6 depicts, from left to right, the respective rotation speeds of the sun gear S1 of the inner planetary gear device 54, the ring gear R1 of the inner planetary gear device 54 and the sun gear S2 of the outer planetary gear device 16, the carrier CA1 of the inner planetary gear device 54, the carrier CA2 of the outer planetary gear device 16, and the ring gear R2 of the outer planetary gear device 16.

Describing the rotation speed of the inner planetary gear device 54 depicted in FIG. 6, the carrier CA1 is coupled to the stator 26 and therefore has the rotation speed of zero. The ring gear R1 acting as an input element is coupled to the electric motor MG (rotor 28) and therefore has the rotation speed equal to the rotation speed Nmg of the electric motor MG. The sun gear S1 acting as the output element has a rotation speed Nout2 based on the gear ratio γ1 of the inner planetary gear device 54. As can be seen from FIG. 6, the inner planetary gear device 54 increases the speed of the rotation of the electric motor MG and outputs the rotation from the sun gear S1. The outer planetary gear device 16 is the same as the example and will not be described.

In the drive device 50 configured as described above, the first clutch C1 is released and the second clutch C2 is engaged during low-speed running. Therefore, the second power transmission path PASS2 is put into the coupled state to make a shift to the low-speed gear stage at which the rotation of the electric motor MG is reduced in speed. When a vehicle speed increases to a high-speed running state, since the first clutch C1 is engaged while the second clutch C2 is released, the first power transmission path PASS1 is put into the coupled state to make a shift to the high-speed gear stage at which the rotation of the electric motor MG is increased in speed. As described above, also in the drive device 50, the first clutch C1 and the second clutch C2 are selectively engaged to enable shifting between the two gear stages.

As described above, according to this example, the drive device 50 can compactly be configured in the axial direction as is the case with the example. The inner planetary gear device 54 is made up of a double pinion type planetary gear device with the carrier CA1 of the inner planetary gear device 54 coupled to the stator 26, the ring gear R1 of the inner planetary gear device 54 coupled to the rotor 28, and the sun gear S1 of the inner planetary gear device 54 coupled via the first clutch C1 to the drive wheels 14, and the outer planetary gear device 16 is made up of a single pinion type planetary gear device with the sun gear 82 of the outer planetary gear device 16 coupled to the rotor 28, the ring gear R2 of the outer planetary gear device 16 coupled to the case 18, and the carrier CA2 of the outer planetary gear device 16 coupled via the second clutch C2 to the drive wheels 14. As a result, either the first clutch C1 or the second clutch C2 can selectively be coupled to achieve shifting between the two gear stages.

Although the examples of the present invention have been described in detail with reference to the drawings, the present invention is also applied in other forms.

For example, the examples may not necessarily independently be implemented and the examples may be implemented in a combined manner as needed. For example, the one-way clutch F0 can be used instead of the second clutch C2 in the vehicle drive device 50 including the double pinion type inner planetary gear device 54.

The coupling configurations of the inner planetary gear devices 12, 54 and the outer planetary gear device 16 of the examples are one example and may be changed as needed in a range without inconsistency. Therefore, the inner planetary gear device and the outer planetary gear device may act not only as a speed reduction mechanism but also as a speed increasing mechanism depending on the coupling configuration.

Although the inner planetary gear devices 12, 54 are disposed on the inner circumferential side of the rotor 28 of the electric motor MG, the inner planetary gear devices 12, 54 may not necessarily entirely be disposed on the inner circumferential side and may partially project from the rotor 28 in the axial direction.

Although the one-way clutch F0 is disposed instead of the second clutch C2 on the drive device 40 of the example, the second clutch C2 is not a limitation and the one-way clutch F0 may be disposed instead of the first clutch C1.

Although the shift to the high-speed gear stage is made when the first clutch C1 is engaged and the shift to the low-speed gear stage is made when the second clutch C2 is engaged in the examples, this is not a limitation. For example, if the gear ratio γ1 of the inner planetary gear device is set larger than the gear ratio γ2 of the outer planetary gear device, the shift to the low-speed gear stage is made when the first clutch C1 is engaged and the shift to the high-speed gear stage is made when the second clutch C2 is engaged. In other words, the relationship of magnitude of the gear ratio γ1 of the inner planetary gear device 12 and the gear ratio γ2 of the outer planetary gear device 16 may be changed as needed.

Although the ring gear R1 of the inner planetary gear device 12 and the sun gear S2 of the outer planetary gear device 16 are integrally disposed on the rotor 28 in the examples, the gears may not necessarily integrally be disposed and may separately be disposed. Alternatively, only one of the ring gear R1 and the sun gear S2 may integrally be formed with the rotor 28.

The first clutch C1 and the second clutch C2 are not limited to hydraulic friction engagement devices or electromagnetic clutches in the examples. For example, clutches of other types such as dry friction clutches may be used.

Although the output shaft 20 is coupled via the final gear pair 22 and the differential device 24 to the drive wheels 14 in the examples, this is one example and may be changed as needed.

The above description is merely an embodiment and the present invention can be implemented in variously modified and improved forms based on the knowledge of those skilled in the art.

NOMENCLATURE OF ELEMENTS 10, 40, 50: vehicle drive device
12, 54: inner planetary gear device
14: drive wheels
16: outer planetary gear device
18: case (non-rotating member)
26: stator
28: rotor
C1: first clutch
C2: second clutch
F0: one-way clutch
MG: electric motor
S1: sun gear of the inner planetary gear device
S2: sun gear of the outer planetary gear device
CA1: carrier of the inner planetary gear device
CA2: carrier of the outer planetary gear device
R1: ring gear of the inner planetary gear device
R2: ring gear of the outer planetary gear device
PASS1: first power transmission path
PASS2: second power transmission path

The invention claimed is:

1. A vehicle drive device having an electric motor with a rotor disposed on an outer circumferential side of a stator, comprising:
 a first power transmission path coupling an inside of the rotor and drive wheels;
 a second power transmission path coupling an outside of the rotor and the drive wheels;
 an inner planetary gear device being disposed on the first power transmission path; and
 an outer planetary gear device being disposed on the second power transmission path,
 the first power transmission path and the second power transmission path having different gear ratios,
 one power transmission path of the first power transmission path and the second power transmission path being coupled to the drive wheels to make a gear change, and
 the inner planetary gear device and the outer planetary gear device being arranged to overlap with the rotor in a radial direction.

2. The vehicle drive device of claim 1, wherein
 the rotor of the electric motor is formed axially longer than the stator to dispose the inner planetary gear device on an inner circumferential side of the rotor, wherein
 the outer planetary gear device is disposed on an outer circumferential side of the rotor, wherein
 a ring gear of the inner planetary gear device is integrally formed on the inner circumferential side of the rotor, and wherein
 a sun gear of the outer planetary gear device is integrally formed on the outer circumferential side of the rotor.

3. The vehicle drive device of claim 2, wherein
 the inner planetary gear device is made up of a single pinion planetary gear device with a sun gear of the inner planetary gear device coupled to the stator, the ring gear of the inner planetary gear device coupled to the rotor, and a carrier of the inner planetary gear device coupled via a first clutch to the drive wheels, and wherein
 the outer planetary gear device is made up of a single pinion planetary gear device with the sun gear of the outer planetary gear device coupled to the rotor, a ring gear of the outer planetary gear device coupled to a non-rotating member, and a carrier of the outer planetary gear device coupled via a second clutch to the drive wheels.

4. The vehicle drive device of claim 2, wherein
 the inner planetary gear device is made up of a double pinion planetary gear device with a carrier of the inner planetary gear device coupled to the stator, the ring gear of the inner planetary gear device coupled to the rotor, and a sun gear of the inner planetary gear device coupled via a first clutch to the drive wheels, and wherein
 the outer planetary gear device is made up of a single pinion planetary gear device with the sun gear of the outer planetary gear device coupled to the rotor, a ring gear of the outer planetary gear device coupled to a non-rotating member, and a carrier of the outer planetary gear device coupled via a second clutch to the drive wheels.

5. The vehicle drive device of claim 3, wherein
 one of the first clutch and the second clutch is made up of a one-way clutch.

* * * * *